United States Patent [19]

Nishiuchi et al.

[11] Patent Number: 5,216,657
[45] Date of Patent: Jun. 1, 1993

[54] METHOD AND APPARATUS FOR TIMING VARIABLE OPTICAL INFORMATION RECORDING

[75] Inventors: Kenichi Nishiuchi, Moriguchi; Noboru Yamada, Hirakata; Nobuo Akahira, Yahata; Kazutoyo Hirosawa, Higashiosaka; Tomio Yoshida, Katano; Shinji Kubota, Moriguchi, all of Japan

[73] Assignee: Matsushita Electric Industrial Co., Ltd., Osaka, Japan

[21] Appl. No.: 939,046

[22] Filed: Sep. 3, 1992

Related U.S. Application Data

[63] Continuation of Ser. No. 409,094, Sep. 19, 1989, abandoned.

[51] Int. Cl.$^5$ ............................................... H04N 5/76
[52] U.S. Cl. ............................................. 369/60; 369/59
[58] Field of Search ................... 360/27; 369/59, 60, 369/47, 100, 110, 124, 83-84

[56] References Cited

U.S. PATENT DOCUMENTS

| | | | |
|---|---|---|---|
| 4,425,637 | 1/1984 | Tanaka et al. | 369/124 |
| 4,800,550 | 1/1989 | Yamauchi | 369/47 |
| 4,908,811 | 3/1990 | Yokogawa et al. | 369/60 |
| 4,982,396 | 1/1991 | Yasuoka et al. | 369/100 |

OTHER PUBLICATIONS

"High Speed Overwritable Phase Change Optical Disk Material", Noboru Yamada et al., Japanese Journal of Applied Physics, vol. 26 (1987) Supplement 26-4, pp. 61-66.

Primary Examiner—Andrew L. Sniezek
Assistant Examiner—Won Tae C. Kim
Attorney, Agent, or Firm—Wenderoth, Lind & Ponack

[57] ABSTRACT

A method and an apparatus for recording information signals on an optical information recording medium which is reversibly changeable between optically distinguishable states corresponding to an irradiating condition of a bundle of high density energy such as laser beam. The starting point of recording signals is randomly changed, and the thermal history of the recording material by the beam irradiation is averaged and the number of repetition recording times is improved. A delay circuit is provided, and reference recording gate signals are formed on the basis of format signals obtained from a recording medium, and a random delay time is set just thereafter, and the starting point of recording of recording signals is started.

9 Claims, 5 Drawing Sheets

METHOD AND APPARATUS FOR TIMING VARIABLE OPTICAL INFORMATION RECORDING

This application is a Continuation of now abandoned application, Ser. No. 07/409,094, filed Sep. 19, 1989 now abandoned.

BACKGROUND OF THE INVENTION

1) Field of the Invention

The present invention relates to a method and an apparatus for recording signals by irradiating a bundle of high-density energy on an optical information recording medium.

2) Description of the Prior Art

The technique of recording and reproducing information signals utilizing a laser beam has been known and is currently applied to document files and data files extensively. Moreover, examples of research development of a rewritable recording system having an erasing function are also being reported.

One of the above methods entails a phase-change typed optical recording medium utilizing a reversible change of state either between amorphous and crystalline or between crystalline and crystalline. A recording layer for the optical recording medium is characterized in that an amorphous state or a crystalline state is formed and these states are reversibly changed according to the reached temperature and the cooling condition in the course of irradiating the laser beam. The amorphous state is different from the crystalline state in the complex index of refraction consisting of the index of refraction n and the extinction coefficient k, and the signals are recorded utilizing the difference of optical transmission or reflection.

To realize the aforementioned operation, the method of irradiating a laser beam modulated between a recording power level Pw and an erasing power level Pe .(Pw>Pe) on the recording medium is proposed in, for example, the Japanese Journal of Applied Physics, Vol. 26 (1987), Suppl. 26-4, p. 61-66. When the laser beam modulated in response to information signals is irradiated on the recording layer, the portion where the recording power Pw is irradiated is turned to be in the amorphous state and the portion where the erasing power Pe is irradiated is turned to be in the crystalline state regardless of the state thereof before the laser beam irradiation. As a result, the recording and the erasing can be simultaneously be carried out by one spot, and thus overwriting is made possible. Here, while the change of state between amorphous and crystalline has been described above, the change of state between crystalline and crystalline results in the same by the correspondence of the above amorphous state to a second crystalline state.

As described above, the laser beam modulated between two power levels is irradiated to perform information recording on the optical disk. However, if the signals are repeatedly recorded on the same track, the recording medium is gradually degraded according to the thermal history, and as a result, the amplitudes of reproduced signals are apt to be decreased. Especially, there is a problem that in when a signal of a constant pattern is repeatedly recorded on a same position on the recording medium and thereafter signals of different patterns are recorded, the amplitude of reproduced signals is deviated and read errors of data (bit error) occur in the process of demodulating the signals. The number of repetition recordings over which the above bit error is substantially caused becomes smaller in comparison with the case of recording different signals every time.

On the recording medium on which the signals of the same pattern are repeatedly recorded, there are a portion on which only the intense laser beam (of the recording power level) is condensed and a portion on which only the feeble laser beam (of the erasing power level) is irradiated in the aforementioned phenomenon. For this reason, adjacent portions have been subjected to different times of repetition recordings. When a signal of another pattern is recorded on such portions and reproduced, the amplitude of the reproduced signal varies depending on the laser beams that have irradiated the recorded portion in the past. Namely, since the thermal deterioration is significant in the portion where the intense laser beam has always been condensed and irradiated, the reproduced signal amplitude is decreased. On the other hand, since the thermal deterioration is slight in the portion where only the feeble laser beam has been irradiated, the reproduced signal amplitude is as large as in the initial condition. When the aforementioned difference in amplitude has occurred, peak shift and a lack of signals occur in demodulating the data signals, thereby causing bit errors. It is difficult to consider that the same data signals are repeatedly recorded in the actual recording. However, even if the data value itself is changed in recording the data signals, the pattern of a frame signal giving indications between data, a clock signal portion or the like is the same. Therefore, when the information signals are repeatedly recorded more frequently, the errors would be caused for the above reason.

SUMMARY OF THE INVENTION

It is an object of the present invention to provide a method of increasing the repetition times of the recording and erasing on a recording medium utilizing optical energy.

To achieve the above object, the relative positional relation between a recording medium and a starting point at which a laser beam begins to be irradiated on the recording medium corresponding to an information signal is changed every repetitive recording in accordance with the present invention. In other words, when overwriting new information on a track of an optical recording medium on which previously written information is recorded, a starting timing of irradiation of a laser beam in response to each information signal is varied from a starting timing of irradiation of a laser beam used for writing the previously written information.

According to the aforementioned configuration, even if signals of the same pattern are repeatedly overwritten on the same track on the optical recording medium, recorded marks are formed in different positions on the recording medium. Therefore, the thermal history can be averaged in each point on the recording medium and the deviation of the local amplitude can be eliminated. Accordingly, the number of repetitive recording times on the recording medium can be increased.

DESCRIPTION OF THE PREFERRED EMBODIMENTS

Figure 1:
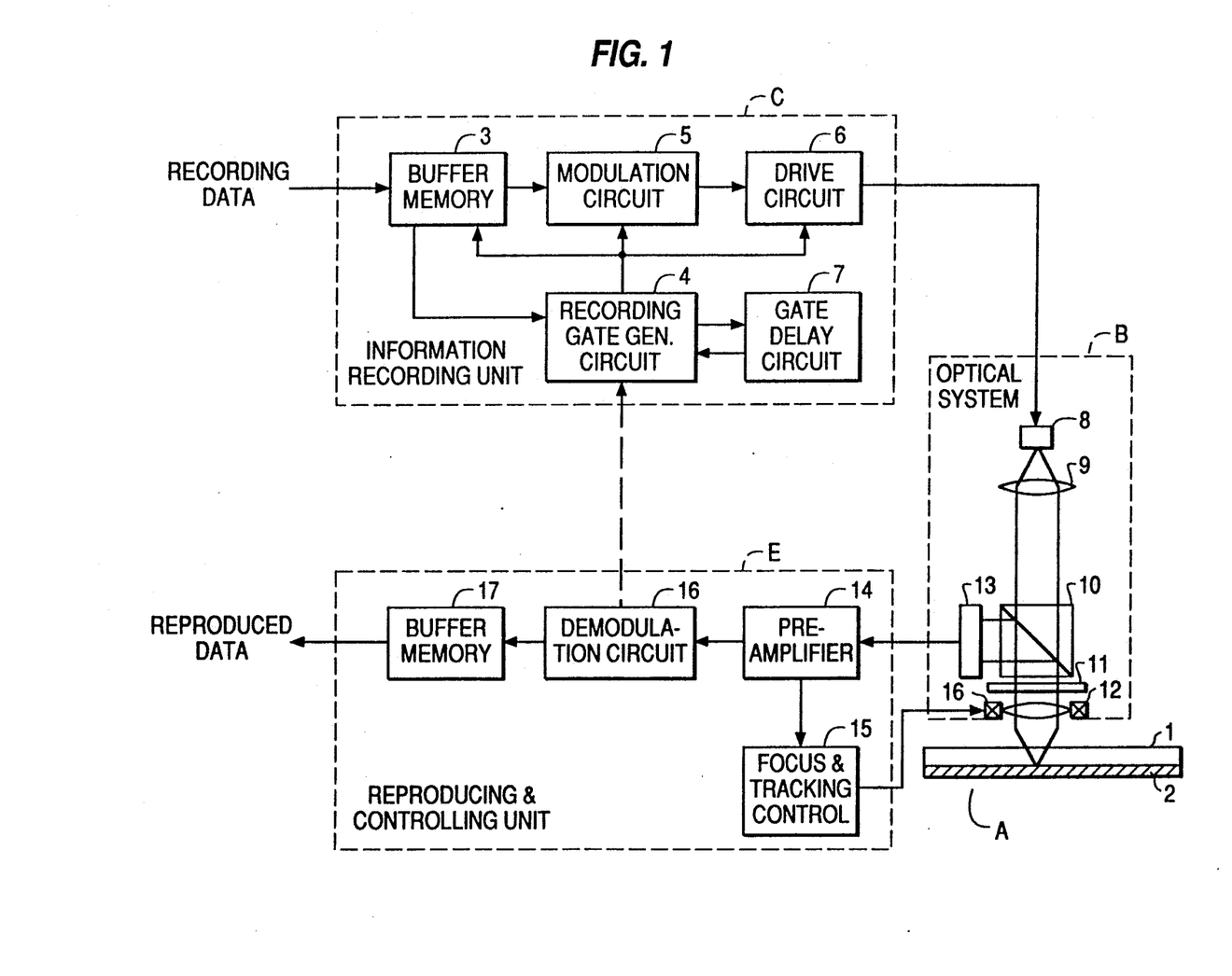
FIG. 1 is a diagram showing a configuration of a recording apparatus in accordance with the present invention.

FIG. 1 is a diagram showing a configuration of one example of a recording apparatus in accordance with the present invention. The present apparatus comprises an optical disk A as an information recording medium, an optical system B for irradiating a laser beam on the optical disk A, an information recording unit C for modulating the laser beam and a reproducing and controlling unit E for reproducing the information from the optical disk A and controlling the laser spot.

The optical disk A is comprised of a substrate 1 and a recording layer 2, and is mounted on a shaft of a rotary motor.

A resin such as polymethylmethacrylate(PMMA), polycarbonate (PC) or the like, or a glass is used as the substrate 1. In the phase change between amorphous and crystalline, GeTe system, GeSbTe system, especially $GeSb_2Te_4$ and $Ge_2Sb_2Te_5$, InSe system, InSeTlCo system, GeSnTeAu system, GeSbTeSe system, SeSnTe0 system, SeTeS system, and the like can be used as materials for the information recording layer 2 utilizing a heating effect by the light irradiatation. Moreover, InSb system, AgZn system and the like can be used as phase change materials between different crystallines. TbFeCo, GdTbFe and the like can be used as materials for the optically magnetic recording utilizing the magneto-optical effect.

The data signal to be recorded on the optical disk is fed to the information recording unit C and is first temporarily stored in a buffer memory 3. The data in the buffer memory 3 is read out in synchronous with a gate signal outputted from a recording gate generating circuit 4 and is, for example, 2-7 modulated by a modulation circuit 5. The aforementioned modulation circuit 5 performs the 2-7 modulation of the above recording data as well as generates sector signals, synchronous signals, index signals and the like and inserts them into the above modulated data. A driving circuit 6 is synchronized with a writing gate from the recording gate generating circuit 4 and a wave-shaped pulse current corresponding to the modulated data is produced Moreover, the gate signal from the above recording gate generating circuit 4 is once passed through a gate delay circuit 7, is caused to generate a time delay and is inputted to the recording gate generating circuit 4 again.

Furthermore, when a signal is reproduced, a constant reproducing current is generated from the driving circuit 6.

A semiconductor laser diode 8 having a wavelength of 780 nm is used as an optical source in the optical system B The light of the semiconductor laser diode 8, which is modulated according to the current from the driving circuit 6, is made into a parallel beam by a collimator lens 9, is transmitted through a deflecting beam splitter 10 and a ¼ wavelength plate 11, and is condensed to be a spot diameter having the size of about 1 μm that is the limit of wavelength on the recording layer 2 of the optical disk A by means of an object lens 12. Moreover, the reflected light from the recording layer 2 is passed through the object lens 12 and the ¼ wavelength plate 11 again, is reflected by the deflecting beam splitter 10, and is received by a photo detector 13. The signal converted photoelectrically by the photo detector 13 is amplified by a preamplifier 14 in the reproducing and controlling unit E.

In the reproducing and controlling unit E, the low-frequency component of the signal from the preamplifier 14 is converted by a focus and tracking control circuit 15 into a control signal which drive a voice coil 16 supporting the aforementioned object lens 12 to perform the focusing and tracking of the spot on the optical disk. On the other hand, the high-frequency component of the signal from the preamplifier 14, namely the data signal from the mark formed on the optical disk A is demodulated by a demodulation circuit 16. The demodulated reproduced data is temporarily stored in a buffer memory 17. The data thus stored in the buffer memory 17 is read out as a reproduced data.

Further, a format signal showing a recorded format on the optical disk and contained in the demodulated reproduced data is sent to the recording gate generating circuit 4.

Embodiment 1

Figure 2:
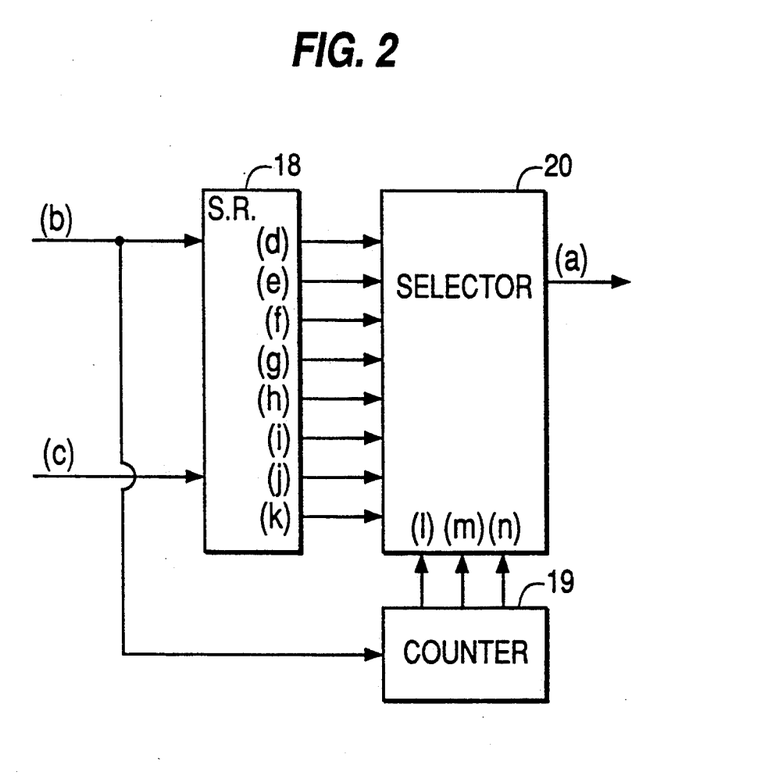
FIG. 2 is a diagram showing a configuration of a gate delay circuit in a first embodiment, FIGS. 3(a)-(g) constitute is a timing chart of the first embodiment.

FIG. 2 is a diagram showing a configuration of one example of the gate delay circuit 7 shown in FIG. 1. A reference gate signal (b) and a clock signal (c), which are produced by the recording gate generating circuit 4 on the basis of a data signal and a format signal on the optical disk, are applied to a shift register 18. Eight kinds of signals (d) to (k), which have respective time delays in proportion to a clock cycle (1T), are produced in the shift register. The signal waveforms are respectively shown in FIGS. 3(a)-(g). Furthermore, the gate signal is applied to a counter 19 and the binary count signals (1) to (n) are outputted. In a selector 20, a gate signal of an address specified by the signal from the counter 19 is selected, namely one of the signals (d) to (k) from the shift register 18 is outputted as a recording gate signal (o). As a result, a recording gate is obtained, which has eight kinds of time delays for the early recording gate (b). Hereinbefore, while the 8-bit system has been described, the number of bits, namely the number of delay gate patterns, can be increased or decreased as required.

Figure 3A:
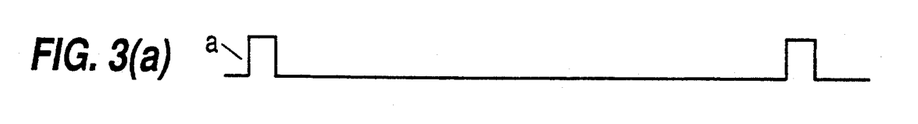
Figure 3B:
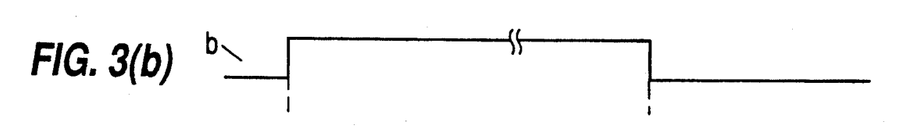
Figure 3C:
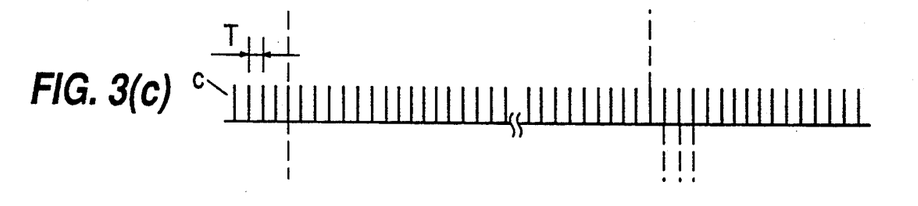
Figure 3D:
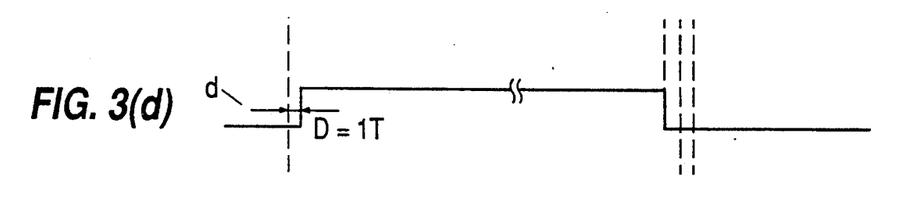
Figure 3E:
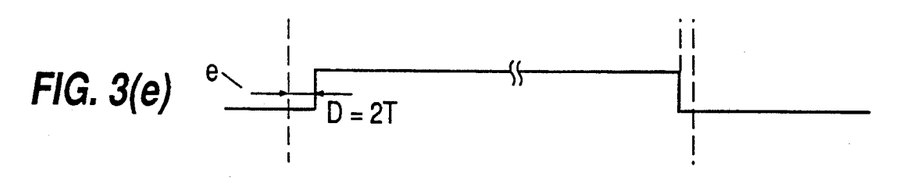
Figure 3F:
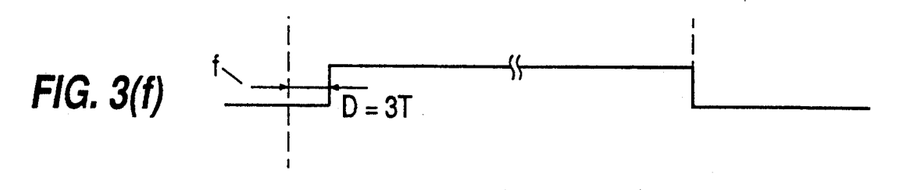
Figure 3G:
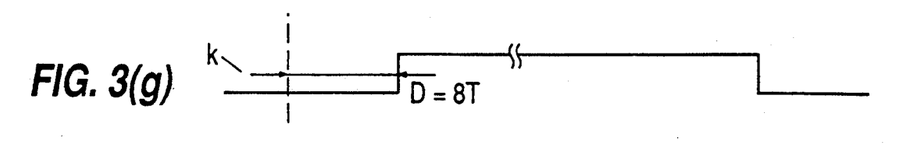

FIGS. 3(a)-(g) constitute is a timing chart of a first embodiment of the present invention. FIG. 3(a) denotes a format signal (a) of the optical disk modulated by the bit formed thereon, and FIG. 3(b) signal to (g) denote gate signals used to verify the present invention. FIG. 3(b) denotes a reference gate signal (b) from the recording gate generating circuit 4, which is obtained by synchronizing the data signal to be recorded with the format signal (a) of the optical disk. Moreover, FIG. 3(c) denotes a clock signal (c) formed on the basis of the data signal to be recorded. The outputs (d) to (k) of the shift register 18 are recording gate signals each having a time delay D for the reference gate (b). FIG. 3(d) denotes the output (d) in the case of D=1T, FIG. 3(e) denotes the output (e) in the case of D=2T, FIG. 3(f) denotes the output (f) where D=3T and FIG. 3(g) denotes the output (k) in the case of D=8T. Thus, the gates having a total of eight kinds of patterns are provided at intervals of 1T. In the conventional recording apparatus, the recording is carried out using only the gate (b). The method of the present invention is carried out by selecting not only the above gate having one pattern but also one of a plurality of gates having various time delays for the reference gate (b) every signal recording. As described above, the change of delay time using a plurality of gates is suited to the change of the relative positions of the optical disk and the driving signal of the laser for recording. According to the above method, even if signals of the same pattern are repeatedly recorded on the same track every time, marks are formed in slightly different positions on the actual optical disk every time. As a result, even if the recording medium in which the thermal history by the light irradiation in each point on the repeatedly recorded track is averaged and of which the amplitude of the reproduced signal is decreased by the repetition, is used, the amplitudes of signals reproduced by marks adjoining each other are equivalent, and therefore the peak shift of reproduced waveform and the lack of signal can't be caused and bit errors can't be caused.

Figure 4:
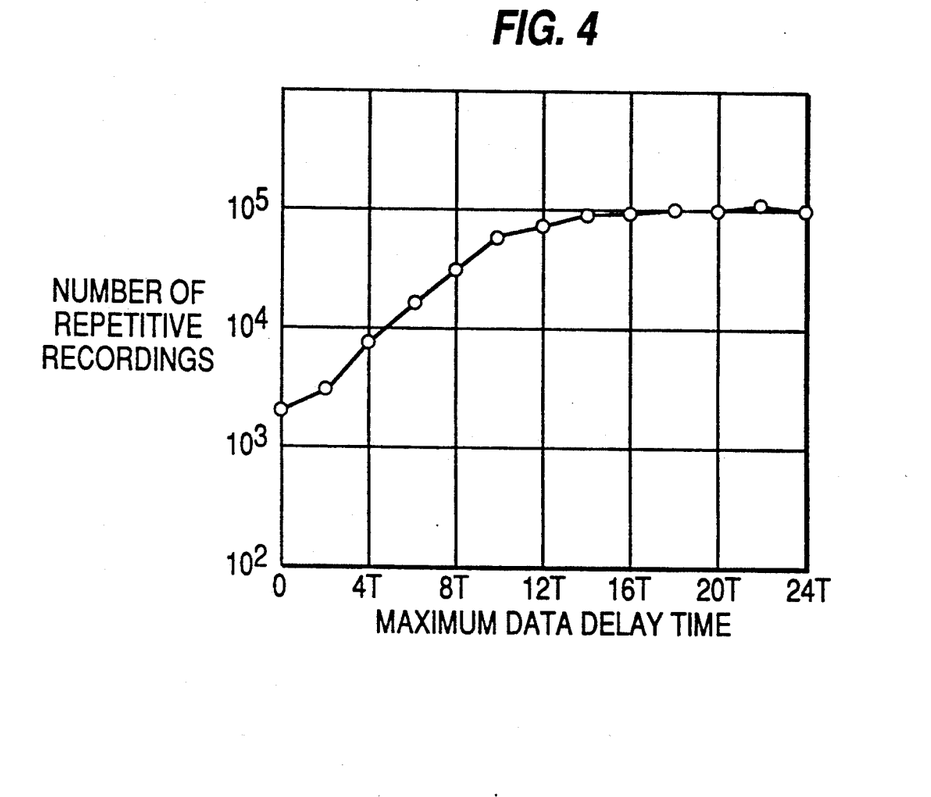
FIG. 4 is a characteristic diagram showing a relation of the delay time and the number of repetitive recording times on the recording gate in the first embodiment.

Here, to clarify the effect of delaying the recording gate actually, FIG. 4 shows a correlation between the delay time D of the recording gate and the maximum frequency of repetition times, causing no bit errors in the case that the recording is repeatedly performed on the optical disk.

The substrate 1 of the optical disk A comprises a polycarbonate resin of which surface is provided with a guide track for the tracking and address signals, a $GeSb_2Te_4$ recording layer and a protective layer made up of ZnS on the recording layer. The optical disk is rotated so that the linear speed can be 10 m/s in the recording portion. The method of modulating data signals used in the recording employs the bit position modulation recording of a 2-7 RLL code and the transfer rate thereof is caused to 5 Mbps. Furthermore, the method of correcting errors in signals employs Read-Solomon code. The recording on the optical disk (overwriting) is performed by modulating the power of the semiconductor laser diode 8 between the recording power and the erasing power in response to the data signal. Moreover, the recording power is 16 mW, the erasing power is 8 mW and the reproducing power is 1 mW on the optical disk.

The recording on the same track is repeatedly performed under the aforementioned recording condition. Two patterns are set to the data signals to be recorded. Signals of a first pattern are repeatedly recorded 1000 times and subsequently signals of a second pattern are recorded. Thereafter the above second pattern signals are compared with the reproduced signals by the recording marks on the optical disk, and thereby bit errors are measured. The above 1000 times recording of the first pattern signals and the cycle of the bit error measurement by the recording of the second pattern signals are continued until bit errors are detected on the reproduced signals. Then, the recording gate is varied every repetitive cycle in response to the pattern generated by the gate delay circuit. Furthermore, the interval of delay time D in each gate pattern is regarded as a time interval 1T (T=200 ns) of clock signals to be recorded. There are four kinds of gate patterns 1T to 4T in the case where a maximum of gate delay time is 4T, and there are 20 kinds of them 1T to 20T in the case where a maximum of gate delay time 20T. FIG. 4 shows the result of measurement under the aforementioned condition. When the gate delay time is increased, the number of repetitive cycles is improved, and when the delay time D is caused to be above 16T, the value is saturated. As described above, the timing of recording data signals is randomly changed, so that the thermal history can be averaged in each position on the recording track. Also the tendency of the average becomes significant with the increase of delay time. Furthermore, it seems that the ablation is caused because the amplitudes of reproduced signals are totally decreased or because of degradation of S/N by the increase of noise etc. in the region where the delay time is above 16T.

The width of delay time 16T which saturates the number of repetitive cycles is four times the 4T which is a maximum of level inversion interval of the 2-7 RLL code, which value is regarded as a standard for averaging the thermal history by the light irradiation of a beam in each point on the recording track. Moreover, the general optical disk apparatus including the present one has a jitter which is a time fluctuating element in a signal processing system, a rotating system of the disk and the like, and the composition thereof reaches a result of measurement. In the system where the jitter is great, even if the delay time is below 16T, the same effect is obtained. On the other hand, in the system where the jitter is little, it is necessary to increase the amount of delay. Furthermore, while a pitch of gate delay time is regarded as 1T in the present measuring system, in the case where minimum interval of marks in the 2-7 RLL cord is 1.5T and the jitter of the measuring system is below 0.5T, a minute region which is poor in the light irradiating history is formed on the periphery of the record mark. To correspond to the above the pitch of gate delay time had better be made still shorter, for example 0.5T or 0.25T.

In the present embodiment, while the result of the method of modulating the 2-7 RLL code is shown, the present method can be applied to other modulating methods similarly. For example, also in this case, when a maximum gate delay time is regarded as Dmax, and a maximum signal inversion interval in the modulating method is regarded as Tmax, desirably the gate delay time is set to establish the following relation.

$$Dmax \geq 4Tmax$$

Furthermore, it is preferable that the maximum gate delay time Dmax is increased and the gate delay pitch is decreased. But if the maximum gate delay time Dmax is increased, the data recording region on the optical disk is decreased. For this reason, from a practical standpoint it is preferable that the maximum gate delay time Dmax is settled in the vicinity of 4Tmax.

Embodiment 2

Figure 5:
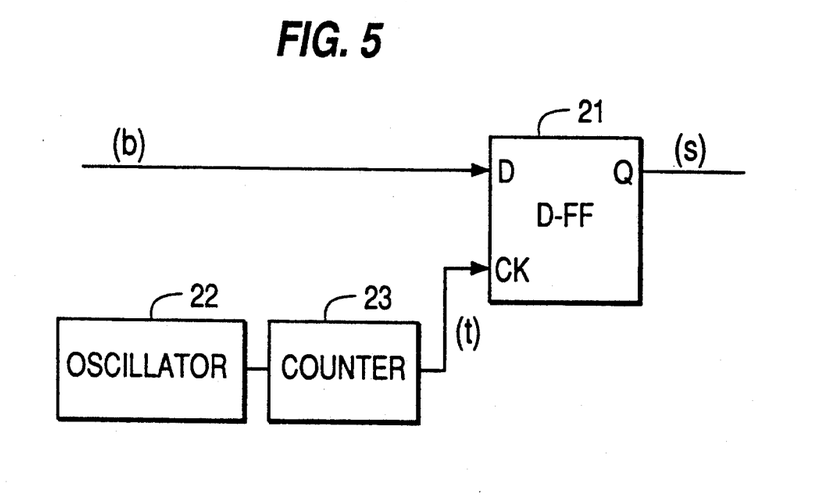
FIG. 5 is a diagram showing a configuration of a gate delay circuit in a second embodiment in accordance with the present invention, and FIGS. 6(a)-(d) constitute is a timing chart of the second embodiment in accordance with the present invention.
Figure 6A:
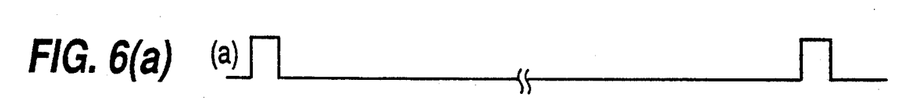
Figure 6B:
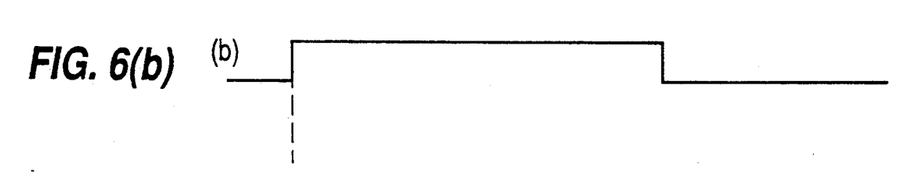
Figure 6C:
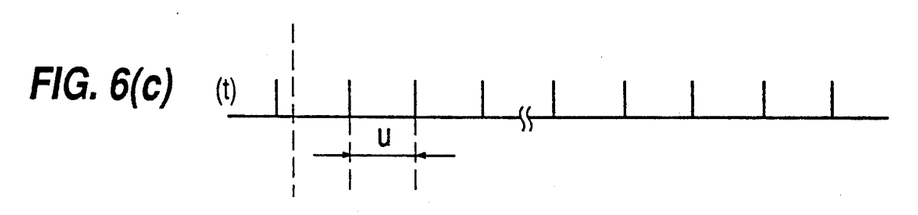
Figure 6D:
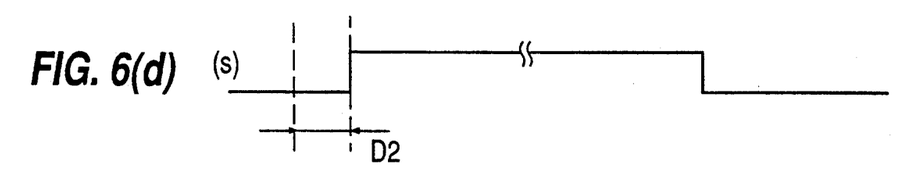

FIG. 5 is a diagram showing a configuration of a gate delay circuit in the second embodiment of the present invention. In the first embodiment, the delay time of the recording gate is changed by stages on the basis of clock signals. On the other hand, the present embodiment relates to the method of obtaining the completely random values within a constant delay time.

A reference gate signal (b) from the recording gate generating circuit 4 is inputted to a D-type flip-flop (hereinafter referred to as D-FF) 21, and a recording gate signal (s) having a constant time delay is outputted from the output end Q. The reference gate signal (b) is converted into the recording gate signal (s) having a random time delay in accordance with the time interval of a clock signal (t) oscillated asynchronously with the reference gate signal in D-FF21. Furthermore, a clock signal (t) is obtained by dividing an output from an oscillator 22 irrespective of the reference gate signal by means of a counter.

The operation will be described in reference to FIGS. 6 (a)–(d) which respectively depict the signals (a), (b), (t) and (s). As described in the first embodiment, the reference gate signal (b) is formed on the basis of the format signal (a) from the optical disk and inputted to the D-FF21. On the other hand, the clock signal (t) oscillated asynchrounously with the reference gate signals (b) is inputted, and the recording gate signal (s) is obtained, which is synchronized with the period of the clock signal (t), namely has a time delay D2 for the reference gate signal. Moreover, the range of time delay D2 is determined according to the period of the clock signal (t). That is to say, the time delay D2 shows the random change within the range of time where the period u of the clock signal (t) is regarded as a maximum. As a result, the random change of the starting point of recording is effected on the optical disk.

Furthermore, a maximum value of the delay time is equal to the period of the clock signal (t) outputted from the counter 23. For this reason, by way of example, the dividing value of the counter is increased or the oscillating frequency of the oscillator 22 is decreased, and thereby the maximum delay time is increased and can be corresponded to the optional value.

As described above, according to the present embodiment, the starting point of recording can completely be changed at random and the degradation of signals can be reduced in the case of the repetitive recording simply by providing the recording gate generator with the D-FF and the oscillator.

The present invention can similarly be applied to another phase-change typed recording medium, and the rewriting-typed recording mediums utilizing heat such as a magneto-optical recording medium, a recording medium making use of the shape change, and the like.

Furthermore, while the overwriting method of utilizing one beam is provided in the present embodiment, there are a method of performing the light irradiation for one-time erasing before the recording and a multi-beam method comprising independent beams for recording and erasing by way of other recording methods. Also in this case, the same effect can be obtained by applying the present invention only to the recording.

As described above, the recording timings of recording signal pulse trains on the optical disk are changed every recording, and thereby the number of repetitive recordings on the optical disk can be increased.

What is claimed is:

1. A method of recording information signals on an optical information recording medium which is reversibly changeable between optically distinguishable states corresponding to a condition of light irradiation, comprising the steps of:
   irradiating said recording medium with an optical beam;
   generating a gate signal having a predetermined duration from a reference timing;
   modulating an information signal during the duration of said gate signal to obtain a modulated signal;
   modulating said optical beam in response to said modulated signal to thereby record the information signal in an area of said recording medium as a record mark formed in said area; and
   delaying said gate signal for a predetermined delay time from said reference timing upon overwriting said area of said recording medium with another information signal, said predetermined delay time being determined such that a position of a record mark formed in said area by overwriting with said another information signal is shifted from a position of the previously formed record mark.

2. A method according to claim 1, wherein said recording medium has recorded thereon a format signal, and wherein a reference timing signal indicative of said reference timing is produced by reading said format signal from said recording medium.

3. A method according to claim 1, further comprising providing as said recording medium a medium which is reversibly changeable between an amorphous state and a crystalline state or between different crystalline states corresponding to a condition of light irradiation.

4. A method according to claim 1, wherein, a maximum value of said delay time Dmax and a maximum level inversion interval of said modulated signal Tmax satisfy the following condition:

$$Dmax \geq 4Tmax$$

5. An apparatus for recording information signals on an optical information recording medium which is reversibly changeable between optically distinguishable states corresponding to a condition of light irradiation, comprising:
   means for irradiating said recording medium with an optical beam;
   means for producing a reference timing signal indicative of a reference timing;
   means responsive to said reference timing signal for generating a gate signal having a predetermined duration and being delayed for a predetermined delay time from said reference timing, including means for varying said delay time;
   means for modulating an information signal during the duration of said gate signal to obtain a modulated signal; and
   means for modulating said optical beam in response to said modulated signal to thereby record the information signal in an area of said recording medium as a record mark formed in said area;
   wherein upon overwriting of said area of said recording medium with another information signal, said delay time varying means varies said delay time such that a position of a record mark formed in said area by overwriting with said another information signal is shifted from a position of the previously formed record mark.

6. An apparatus according to claim 5, wherein said delay time varying means varies said delay time so that a maximum value of said delay time Dmax and a maximum lever inversion interval of said modulated signal Tmax satisfy the following condition:

$$Dmax \geq 4Tmax$$

7. An apparatus according to claim 5, wherein said reference timing signal producing means comprises means for reading a format signal recorded on said recording medium, and means for producing said reference timing signal from said format signal read from said recording medium.

8. An apparatus according to claim 5, wherein said gate signal generating means comprises a gate pulse generating means for generating a gate pulse having said predetermined duration from said reference timing, delay pulse generating means for generating from said gate pulse a plurality of delayed gate pulses which are delayed from said reference timing for predetermined delay times different from one another, and selection means for selecting one of said plurality of delayed gate pulses to obtain said gate signal.

9. An apparatus according to claim 5, wherein said gate signal generating means comprises a gate pulse generating means, for generating a gate pulse having said predetermined duration from said reference timing, clock generating means for generating a clock signal which is asynchronous with said gate pulse, and delay means responsive to said clock signal for delaying said gate pulse for a randomly varying delay time.

* * * * *